(12) United States Patent
Nishimoto (10) Patent No.: US 6,767,146 B2
(45) Date of Patent: Jul. 27, 2004

(54) APERTURE MECHANISM

(75) Inventor: Naoki Nishimoto, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/350,181

(22) Filed: Jan. 24, 2003

(65) Prior Publication Data

US 2003/0147642 A1 Aug. 7, 2003

(30) Foreign Application Priority Data

Feb. 7, 2002 (JP) .................................. 2002-030750

(51) Int. Cl.[7] .............................. G03B 9/02; G03B 17/02
(52) U.S. Cl. .................. 396/463; 396/508; 396/451; 396/6
(58) Field of Search ........................... 396/451, 463, 396/470, 565, 508, 510, 301, 303, 388, 6

(56) References Cited

U.S. PATENT DOCUMENTS 5,999,751 A  * 12/1999 Imamura et al. ............ 396/200
6,239,923 B1 *  5/2001 Takezawa ................... 359/739
6,467,975 B1 * 10/2002 Tsuzuki et al. ............. 396/449

FOREIGN PATENT DOCUMENTS

JP          9-281546      10/1997
JP          11-231190      8/1999

* cited by examiner

Primary Examiner—Russell Adams
Assistant Examiner—Michale Dalakis
(74) Attorney, Agent, or Firm—Young & Thompson (57) ABSTRACT

In a holding frame of the aperture mechanism is formed a holding portion to which is to be fitted a drive mechanism for opening and closing aperture blades. The holding portion can be fitted with either an electrical drive mechanism, having an iris meter, for electrically opening and closing aperture blades and or a manual drive mechanism for supporting rotatably an iris ring to manually open and close the aperture blades. Thus, an aperture mechanism whose manufacturing cost can be substantially reduced by enabling either or both of an electrical drive mechanism for electrically driving aperture blades and a manual drive mechanism for manually driving them to be fitted to a common holding frame of the aperture mechanism is to be provided.

6 Claims, 12 Drawing Sheets

APERTURE MECHANISM

BACKGROUND OF THE INVENTION

1. Field of the Invention

The present invention relates to an aperture mechanism, and more particularly, to the aperture mechanism of the lens barrel for use in a monitoring camera or the like.

2. Description of the Related Art

The aperture mechanism of the lens barrel for use in a monitoring camera or the like usually has a holding frame for holding aperture blades and holding the aperture mechanism in the lens barrel, and a drive mechanism for opening and closing the aperture blades is fitted to this holding frame to unitize the aperture device.

Two types of drive mechanisms for opening and closing aperture blades are known, including for instance an electrical (automatic) type using an iris meter and a manual type for manual operation (see Japanese Patent Application Publication Nos. 9-281546 and 11-231190, etc.).

However, according to the prior art, an automatic aperture mechanism with an electrical drive mechanism and a manual aperture mechanism with a manual drive mechanism differ from each other in the shapes of the aperture blades and holding frame and the holding shape of the lens barrel among other aspects, and the production of the two types of aperture mechanisms as needed by users would entail an extra manufacturing cost.

SUMMARY OF THE INVENTION

Attempted in view of these circumstances, an object of the present invention is to provide an aperture mechanism permitting a substantial saving in manufacturing cost.

In order to achieve the object stated above, the present invention is directed to an aperture mechanism, comprising: aperture blades; a holding frame which holds the aperture blades; and a drive mechanism which opens and closes the aperture blades, the drive mechanism being fitted to the holding frame, wherein the holding frame is adapted to receive a desired one of an electrical drive mechanism which opens and closes the aperture blades electrically and a manual drive mechanism which opens and closes the aperture blades manually as the drive mechanism.

According to the present invention, since either an electrical drive mechanism or a manual drive mechanism can be fitted to a common holding frame, there is no need to alter the configuration of other constituent members than the drive mechanism, such as the shapes of the aperture blades and the holding frame or the holding form of the lens barrel according to whether the electrical drive mechanism or the manual drive mechanism is used, and therefore the manufacturing cost can be substantially reduced.

Preferably, the one of the electrical drive mechanism and the manual drive mechanism are capable of being attached to and detached from the holding frame as desired. Thus, the replacement of the electrical with the manual aperture mechanism, or vice versa, can be easily accomplished by making the electrical drive mechanism or the manual drive mechanism readily attachable to or detachable from the holding frame.

Preferably, a holding portion which holds the drive mechanism is formed on the holding frame; pin engaging portions which engage with drive pins of the drive mechanism and open and close the aperture blades by shifting of the drive pins are arranged on a face other than a holding face of the holding portion where the drive mechanism is held; a first hole through which a drive shaft of an iris meter for driving the drive pins in the electrical drive mechanism are inserted are provided in the holding face; and a second hole through which the drive pins in the manual drive mechanism are inserted are provided in the holding face. By thus making the holding frame, the electrical drive mechanism and the manual drive mechanism can be attachable to the common holding frame.

Preferably, the holding frame is capable of simultaneously receiving both the electrical drive mechanism and the manual drive mechanism, and the aperture blades are opened and closed with a desired one of the electrical drive mechanism and the manual drive mechanism. Instead of fitting only either an electrical drive mechanism or a manual drive mechanism to the holding frame, both drive mechanisms can be fitted at the same time, enabling the operator to accomplish iris adjustment with a desired one of the two drive mechanisms.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Aperture mechanisms, which are preferred embodiments of the present invention, will be described in detail below with reference to the accompanying drawings.

Figure 1:
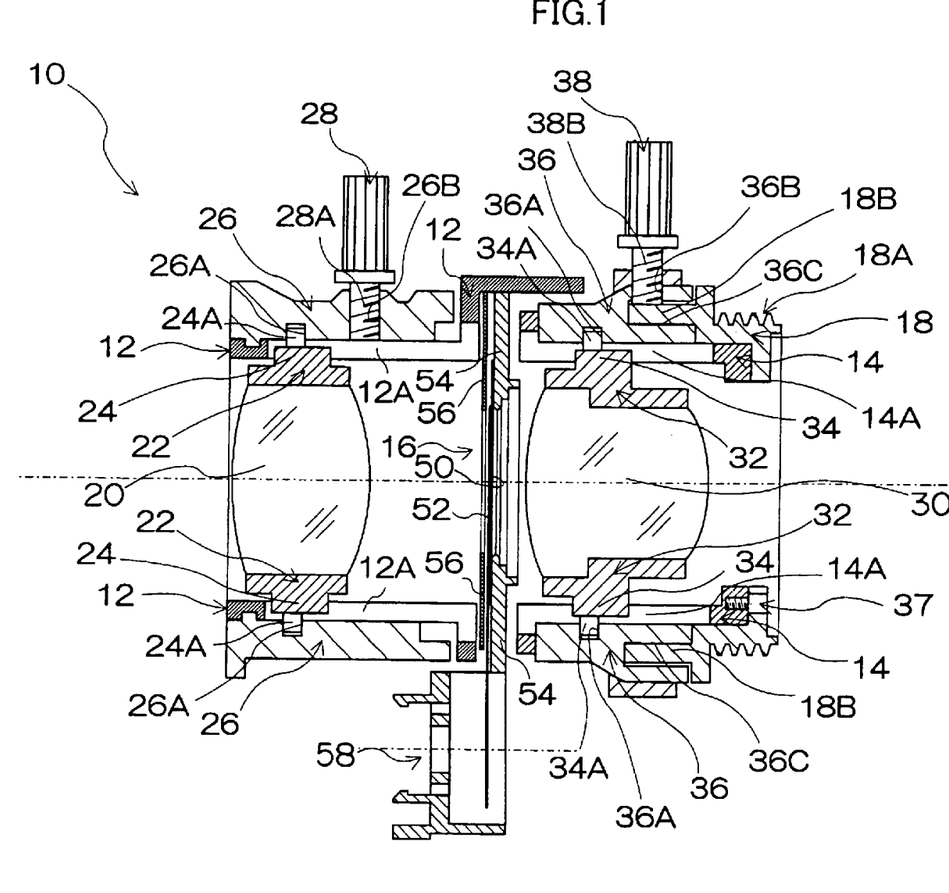
FIG. 1 shows a lateral sectional view of a lens barrel, in which an aperture mechanism according to the invention is arranged, for use mainly in a monitoring camera.

FIG. 1 shows a lateral sectional view of a lens barrel, in which an aperture mechanism according to the invention is arranged, for use mainly in a monitoring camera. A lens barrel 10 illustrated therein is provided with a front fixing cylinder 12, a rear fixing cylinder 14 and an aperture mechanism (aperture) 16. The aperture 16 is held between the front fixing cylinder 12 and the rear fixing cylinder 14, and these front fixing cylinder 12, rear fixing cylinder 14 and aperture 16 are fixed with bolts not shown. Behind the rear fixing cylinder 14 is arranged a mount ring 18 on which a threaded portion 18A is formed, and the lens barrel 10 can be fitted to a camera body (not shown) with this mount ring 18.

In the front fixing cylinder 12 is arranged a focusing lens assembly 20, held by a lens frame 22. On the lens frame 22 are formed engaging portions 24 and 24 protruding from its circumferential face. On the other hand, in the front fixing cylinder 12 are formed straight grooves 12A and 12A in the direction of the optical axis, and the engagement of the engaging portions 24 and 24 of the lens frame 22 with the straight grooves 12A and 12A of the front fixing cylinder 12 causes the lens frame 22 and the focusing lens assembly 20 to shift straight, guided by the straight grooves 12A.

On the outer circumferential face of the front fixing cylinder 12 is rotatably arranged a focusing ring 26, and on the inner circumferential face of this focusing ring 26 are formed cam grooves 26A and 26A. At the tips of the engaging portions 24 and 24 of the lens frame 22 are protrusively arranged cam pins 24A and 24A, and these cam pins 24A and 24A engage with the cam grooves 26A and 26A of the focusing ring 26. Therefore, when the focusing ring 26 is rotated, the crossing positions between the cam grooves 26A and 26A of the focusing ring 26 and the straight grooves 12A and 12A of the front fixing cylinder 12 are displaced in the direction of the optical axis, and according to their crossing positions are displaced the lens frame 22 and the focusing lens assembly 20 in the direction of the optical axis. Thus, it is made possible to adjust the set position of the focusing lens assembly 20 to adjust focusing by rotating the focusing ring 26 in this way.

In the focusing ring 26 is formed a tapped hole 26B penetrating from the outer circumferential face to the inner circumferential face, and the threaded portion 28A of a knob 28 is screwed into this tapped hole 26B to fit the knob 28 to the focusing ring 26. The operator can use this knob 28 to rotate the focusing ring 26, or keep the focusing ring 26 fixed in a desired focused position by screwing in the threaded portion 28A of the knob 28 to press the tip of the threaded portion 28A against the circumferential face of the front fixing cylinder 12. When the focusing ring 26 is to be rotated from this fixed position, the knob 28 should be loosened.

In the rear fixing cylinder 14 is arranged a zoom lens assembly 30, held by a lens frame 32. On the lens frame 32 are formed engaging portions 34 and 34 protruding from the circumferential face. On the other hand, in the rear fixing cylinder 14 are formed straight grooves 14A and 14A in the direction of the optical axis, and the engagement of the engaging portions 34 and 34 of the lens frame 32 with the straight grooves 14A and 14A of the rear fixing cylinder 14 causes the lens frame 32 and the zoom lens assembly 30 to shift straight in the direction of the optical axis, guided by the straight grooves 14A.

On the outer circumferential face of the rear fixing cylinder 14 is arranged a zoom ring 36, and on the inner circumferential face of this zoom ring 36 are formed the cam grooves 36A and 36A. In the rear end face of the zoom ring 36 is formed an annular recess 36C, and an annular projection 18B formed on the fore end face of the mount ring 18 is inserted into this recess 36C. The mount ring 18 is fixed to the rear fixing cylinder 14 with a bolt 37.

At the tips of the engaging portions 34 and 34 of the lens frame 32 are protrusively arranged cam pins 34A and 34A, and these cam pins 34A and 34A engage with the cam grooves 36A and 36A of the zoom ring 36. Therefore, when the zoom ring 36 is rotated, the crossing positions between the cam grooves 36A and 36A of the zoom ring 36 and the straight grooves 14A and 14A of the rear fixing cylinder 14 are displaced in the direction of the optical axis, and according to their crossing positions are displaced the lens frame 32 and the zoom lens assembly 30 in the direction of the optical axis. Thus, it is made possible to adjust the set position of the zoom lens assembly 30 to adjust the focal length (the zoom angle) by rotating the zoom ring 36 in this way.

In the zoom ring 36 is formed a tapped hole 36B penetrating from the outer circumferential face to the recess 36C, and the threaded portion 38A of a knob 38 is screwed into this tapped hole 36B to fit the knob 38 to the zoom ring 36. The operator can use this knob 38 to rotate the zoom ring 36, or keep the zoom ring 36 fixed in a desired adjusted position of the focal length by screwing in the threaded portion 38A of the knob 38 to press the tip of the threaded portion 38A against the projection 18B of the mount ring 18 inserted into the recess 36C. When the zoom ring 36 is to be rotated from this fixed position, the knob 38 should be loosened.

To add, although the straight grooves 12A, the engaging portions 24 of the lens frame 22, the cam pins 24A, the cam grooves 26A, the straight grooves 14A, the engaging portions 34 of the lens frame 32, the cam pins 34A and the cam grooves 36A referred to above are arranged in two positions each, upper and lower in the drawing, they can as well be arranged in three positions dividing a circle into three equal portions, and in this way stable shifts can be ensured.

The aperture 16 comprises such members as two aperture blades 50 and 52, a holding frame 54 for holding the aperture blades 50 and 52 behind and fitting and holding the aperture 16 onto the lens barrel 10 (the front fixing cylinder 12 and the rear fixing cylinder 14), and a keep plate 56 for keeping the aperture blades 50 and 52 in front. As will be described in detail afterwards, a holding portion 58 for fitting and holding a drive mechanism to open and close the aperture blades 50 and 52 is formed integrally with the holding frame 54, and an electrical drive mechanism or a manual drive mechanism to be described afterwards is to be fitted to this holding portion 58. The electrical drive mechanism is a drive mechanism for opening and closing the aperture blades 50 and 52 electrically (with an iris meter), while the manual drive mechanism is a drive mechanism for opening and closing the aperture blades 50 and 52 manually. Whichever drive mechanism may be fitted to the holding portion 58 of the aperture 16, all of the members constituting the aperture 16 including the aperture blades 50 and 52, the holding frame 54 and the keep plate 56 are configured of the same members. Therefore, whether the electrical (automatic) aperture mechanism or the manual aperture mechanism is to be used, the common aperture 16 can be used with a resultant saving in manufacturing cost, and moreover the replacement of the electrical with the manual aperture mechanism, or vice versa, can be readily accomplished.

Figure 2:
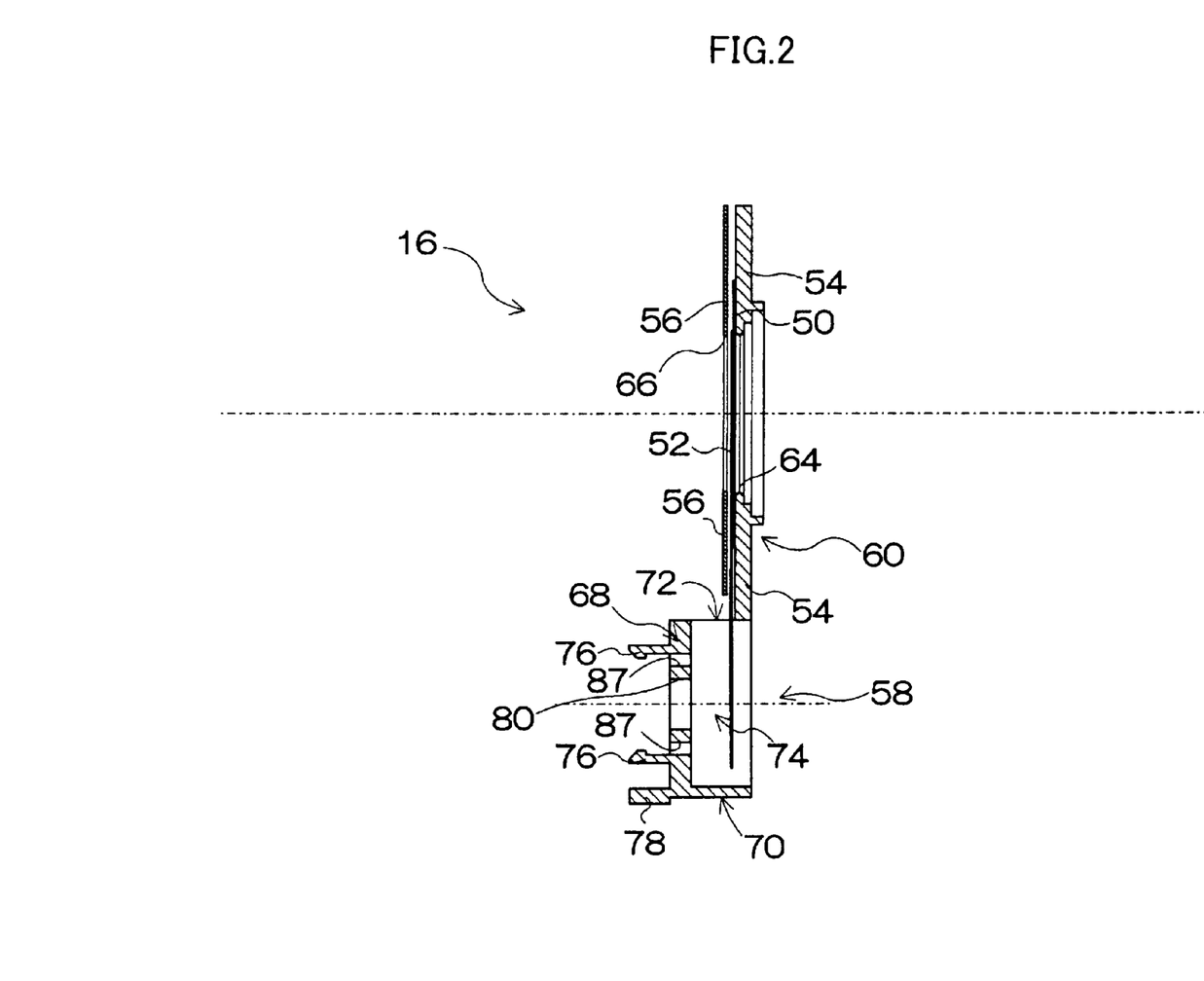
FIG. 2 shows a lateral sectional view of the configuration of only the aperture.
Figures 3A, 3B:
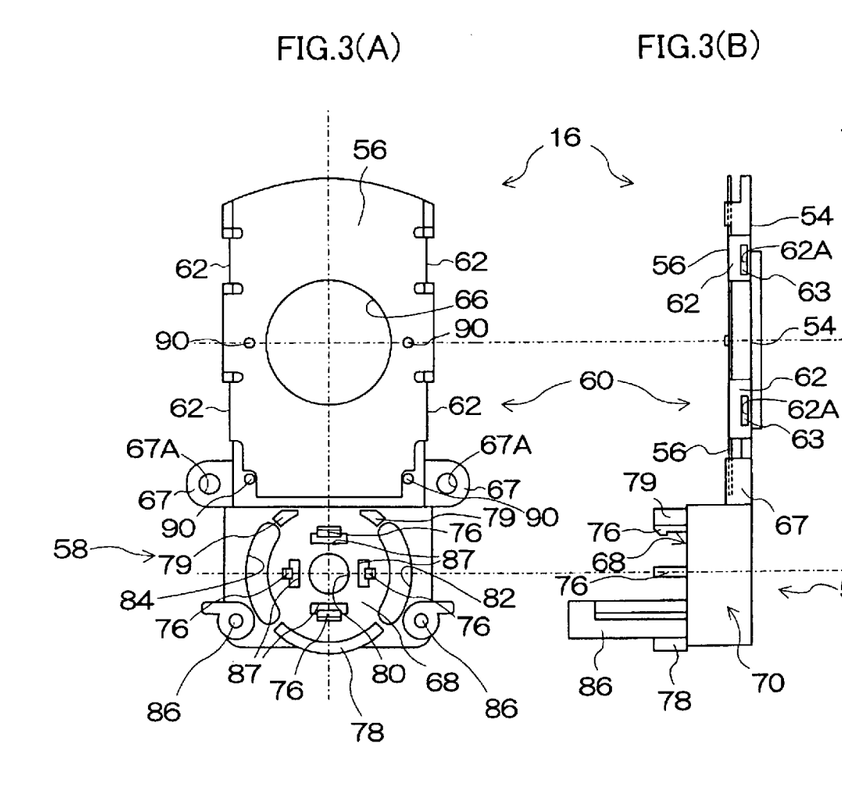
FIGS. 3(A), 3(B) and 3(C) show a front view, a profile and a rear view, respectively, of the external appearance of the aperture.
Figure 3C:
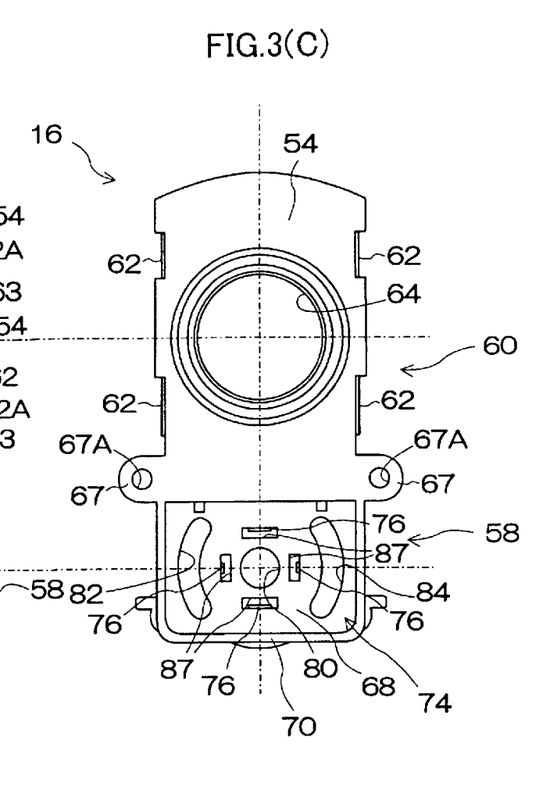

FIG. 2 shows a lateral sectional view of the configuration of only the aperture 16 described above, and FIGS. 3(A), 3(B) and 3(C) show a front view, a profile and a rear view, respectively, of the external appearance of the aperture 16. In FIGS. 3(A) to 3(C), illustration of the aperture blades 50 and 52 is dispensed with.

As shown in FIG. 2 and each of FIGS. 3(A) to 3(C), the holding frame 54 is composed of a holding frame body 60 (the upper part in the drawings) for accommodating and holding mainly the aperture blades 50 and 52 and the holding portion 58 (the lower part in the drawings) for fitting and holding a drive mechanism. The holding frame body 60 is provided on the front side with a space for accommodating the aperture blades 50 and 52, and in front of the space is arranged the keep plate 56. The keep plate 56, as shown in FIGS. 3(A) to 3(C), is fixed to the holding frame body 60 as holes 62A, 62A, 62A and 62A (see FIG. 3(B)) of bends 62, 62, 62 and 62 where the keep plate 56 is bent vertically in four positions of its two sides are engaged with pawls 63, 63, 63 and 63 (see FIG. 3(B)) of the holding frame body 60. At the respective centers of the holding frame body 60 and the keep plate 56 are formed openings 64 and 66 through which the light from the object having come incident into the lens barrel 10 is to pass, and the luminous energy is adjusted by the two aperture blades 50 and 52 in the positions of these openings 64 and 66. To add, as shown in FIGS. 3(A) and 3(B), in projections 67 and 67 disposed protrusively on the two sides of the holding frame body 60 are bored tapped holes 67A and 67A for fitting the aperture 16 to the lens barrel 10. Also, as shown in FIG. 3(A), two each of regulating pins 90, 90, 90 and 90 for regulating the aperture blades 50 and 52 to move straight are provided on the right and left sides of the holding frame to body 60 as will be described in more detail afterwards.

On the holding portion 58 of the holding frame 54 is formed a holding plate (holding face) 68 arranged to protrude farther forward than the holding frame body 60, and a side plate 70 is formed to enclose the flank (in the direction orthogonal to the sheet face of FIG. 2) and the bottom (in the downward direction in FIG. 2) toward the rear side of that holding plate 68. To add, the side plate 70 and the holding frame body 60 are directly linked to each other, and the holding frame body 60 and the holding portion 58 (the holding plate 68 and the side plate 70) are formed integrally. Alternatively, the holding frame body 60 and the holding portion 58 may as well be separate elements.

As shown in FIG. 2, an opening 72 is formed toward the top of the holding portion 58, and base ends of the aperture blades 50 and 52 arranged on the holding frame body 60 are pressed through this opening 72 to be arranged in a space 74 surrounded by the holding plate 68 and the side plate 70.

Four pawls 76, 76, 76 and 76 are arranged protrusively on the holding plate 68 as shown in FIG. 2 and FIGS. 3(A) to 3(C) and three projections 78, 79 and 79 are arranged protrusively along a circle of a prescribed diameter as shown in FIGS. 3(A) and 3(B). Further, as shown in FIG. 2 and FIGS. 3(A) and 3(C), a round hole 80 is bored at the center of the holding plate 68, and arced long holes 82 and 84 are bored along a circle of a prescribed diameter. The actions of these the pawls 76, projections 78 and 79, hole 80, and long holes 82 and 84 will be described afterwards. Cylindrical members 86 and 86 arranged protrusively on the holding plate 68 are members for fitting a cover, to be described afterwards, to enclose the whole holding portion 58. Further, in the holding plate 68 are formed rectangular holes 87, 87, 87 and 87 for absorbing the distortion of the central hole 80 when a member of the drive mechanism to be described afterwards is snapped into the hole 80.

Figure 4A:
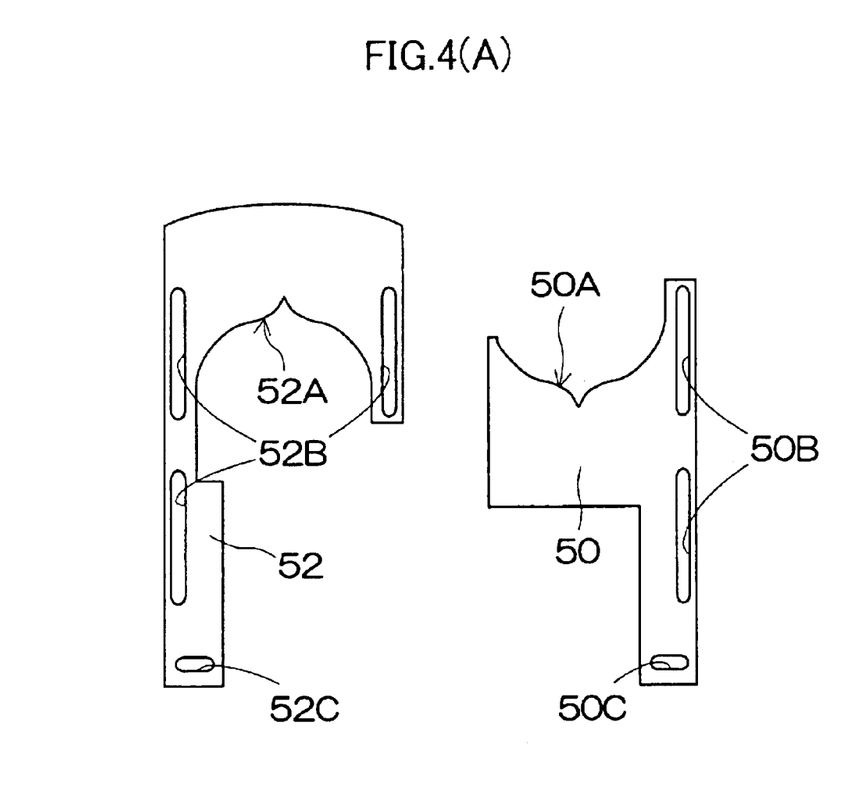
FIGS. 4(A) and 4(B) show a front view of the configuration of the aperture blades.

Now to describe the configuration of the aperture blades 50 and 52, each of the aperture blades 50 and 52 is configured as shown in FIG. 4(A). In the aperture blade 50 is formed a notch 50A of a prescribed shape for forming an iris aperture, and straight grooves 50B and 50B to engage with the two regulating pins 90 and 90 of the holding frame body 60 and a long groove 50C to engage with a drive pin to be described below are bored. Similarly in the aperture blade 52 is formed a notch 52A of a prescribed shape for forming an iris aperture, and straight grooves 52B, 52B and 52B to engage the three regulating pins 90, 90 and 90 of the holding frame body 60 and a long groove 52C with a drive pin to be described below are bored.

Figure 4B:
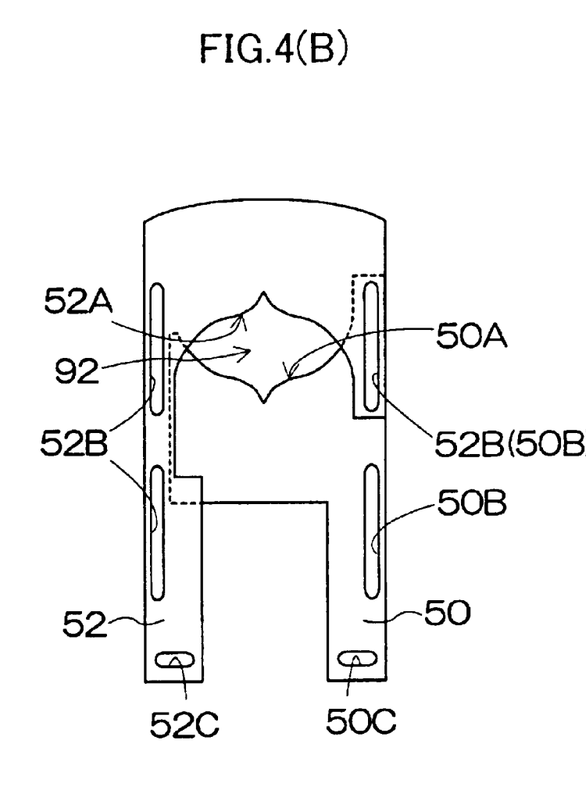

These aperture blades 50 and 52, laid one over the other as shown in FIG. 4(B), are arranged on the holding frame 54, so that the notch 50A of the aperture blade 50 and the notch 52A of the aperture blade 52 form the contour of an iris aperture 92.

Figure 5A:
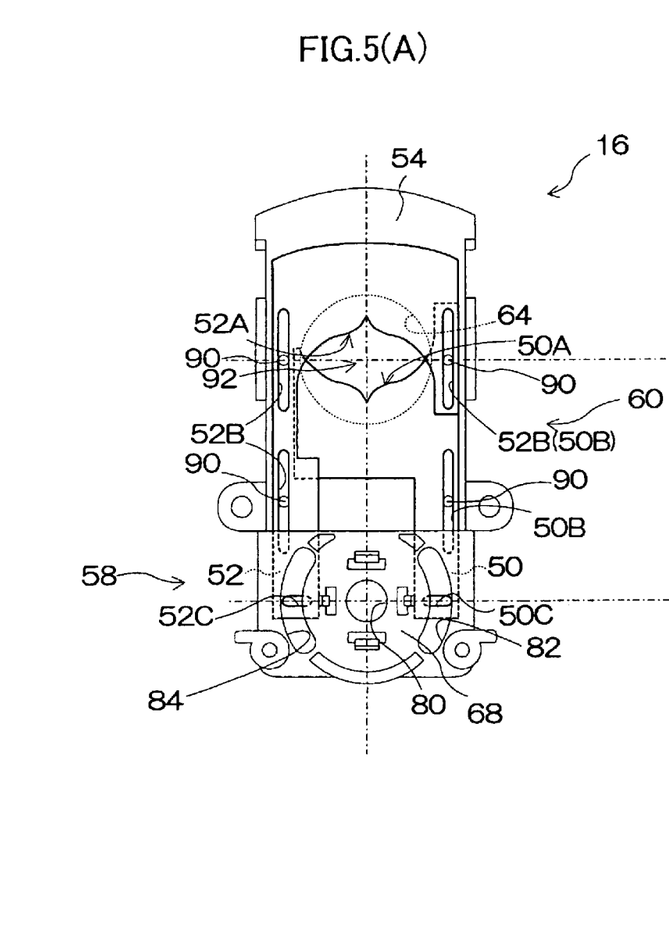
FIGS. 5(A) and 5(B) show a front view and a rear view, respectively, of the positional relationship between the holding frame of the aperture and the aperture blades arranged on the holding frame.
Figure 5B:
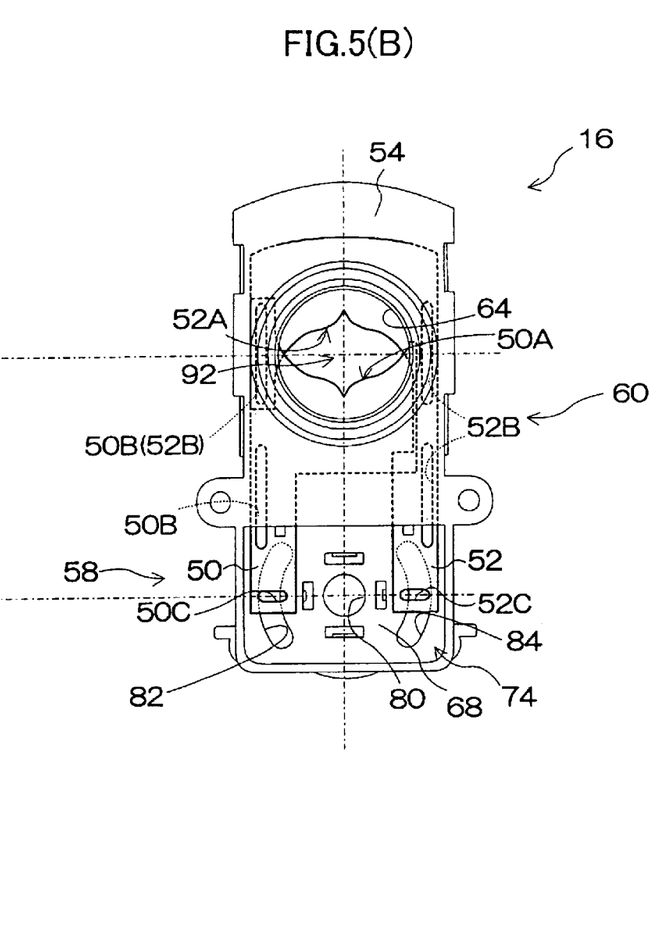

FIGS. 5(A) and 5(B) show a front view and a rear view, respectively, of the positional relationship between the holding frame 54 and the aperture blades 50 and 52 arranged on the holding frame 54. As shown in these drawings, the iris aperture 92 formed by the aperture blades 50 and 52 is arranged in the position of the opening 64 formed in the holding frame body 60 of the holding frame 54, and their base ends where the long grooves 50C and 52C are formed are arranged in the space 74 of the holding portion 58 (on the rear side of the holding plate 68). The respective straight grooves 50B and 52B of the aperture blades 50 and 52 are engaged with the regulating pins 90 in the matching positions of the holding frame body 60 so that the aperture blades 50 and 52 are restricted in movement only in the reciprocating direction vertical to the sheet face of the drawing. The long grooves 50C and 52C formed at the base ends of the aperture blades 50 and 52, respectively, are arranged in the opposing positions of the arced long holes 82 and 84 in the holding plate 68. The drive pins engaging with the long grooves 50C and 52C are rocked by the drive mechanism, whether it is electrical or manual, along the long holes 82 and 84, and the rocking of the drive pins causes the aperture blades 50 and 52, interlocked with the drive pins, to reciprocate in the direction vertical to the sheet face of the drawing.

Figure 6A:
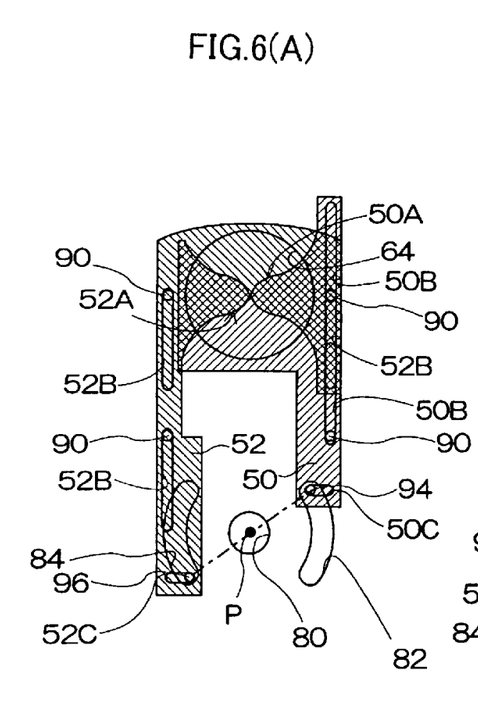
FIGS. 6(A), 6(B) and 6(C) illustrate the operation of drive pins and the opening and closing of the aperture blades by the drive mechanism.
Figure 6B:
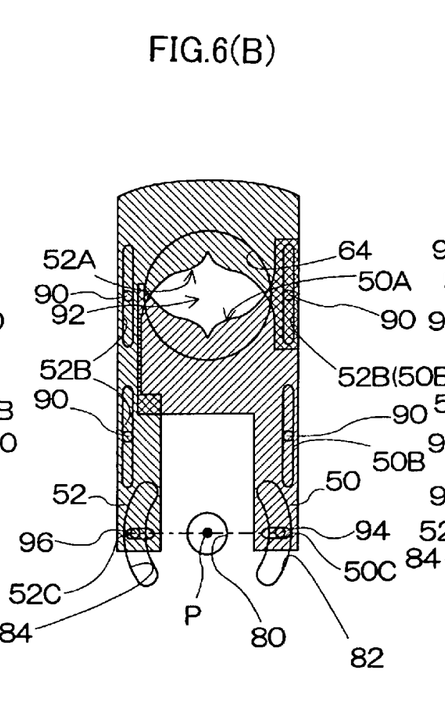
Figure 6C:
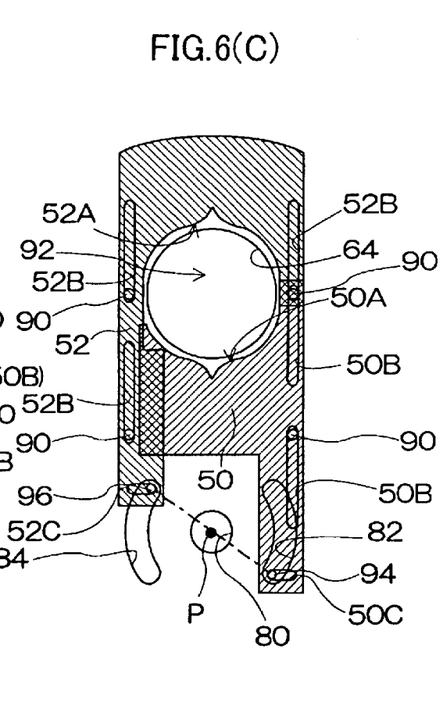

FIGS. 6(A), 6(B) and 6(C) illustrate the operation of the drive pins and the opening and closing of the aperture blades 50 and 52 by the drive mechanism, and in the drawings are shown, in addition to the aperture blades 50 and 52 and drive pins 94 and 96, the opening 64 and the regulating pins 90, 90, 90 and 90 of the holding frame body 60 in the holding frame 54 and the hole 80 and the long holes 82 and 84 of the holding portion 58. The drive pins 94 and 96 are arranged in symmetric positions with respect to the central position P of the hole 80, and the drive pins 94 and 96 rotate around the central position P in an interlocked way. As the drive pins 94 and 96 rotate counterclockwise in the drawing and shift to the end positions shown in FIG. 6(A), the aperture blade 50 shifts upwards in the drawing, and at the same time the aperture blade 52 shifts downwards in the drawing, resulting in closure of the iris aperture 92. This causes the opening 64 of the holding frame body 60 to be shielded not to let the light from the object pass. On the other hand, as the drive pins 94 and 96 rotate clockwise in the drawing from the state of FIG. 6(A) toward the intermediate position shown in FIG. 6(B), the aperture blade 50 shifts upwards in the drawing, and at the same time the aperture blade 52 shifts downwards in the drawing, resulting in expansion of the iris aperture 92. As the drive pins 94 and 96 further rotate clockwise in the drawing and shift to the end positions shown in FIG. 6(C), the iris aperture 92 reaches its most widely opened state to enable the light from the object to pass the whole opening 64 of the holding frame body 60.

Figure 7:
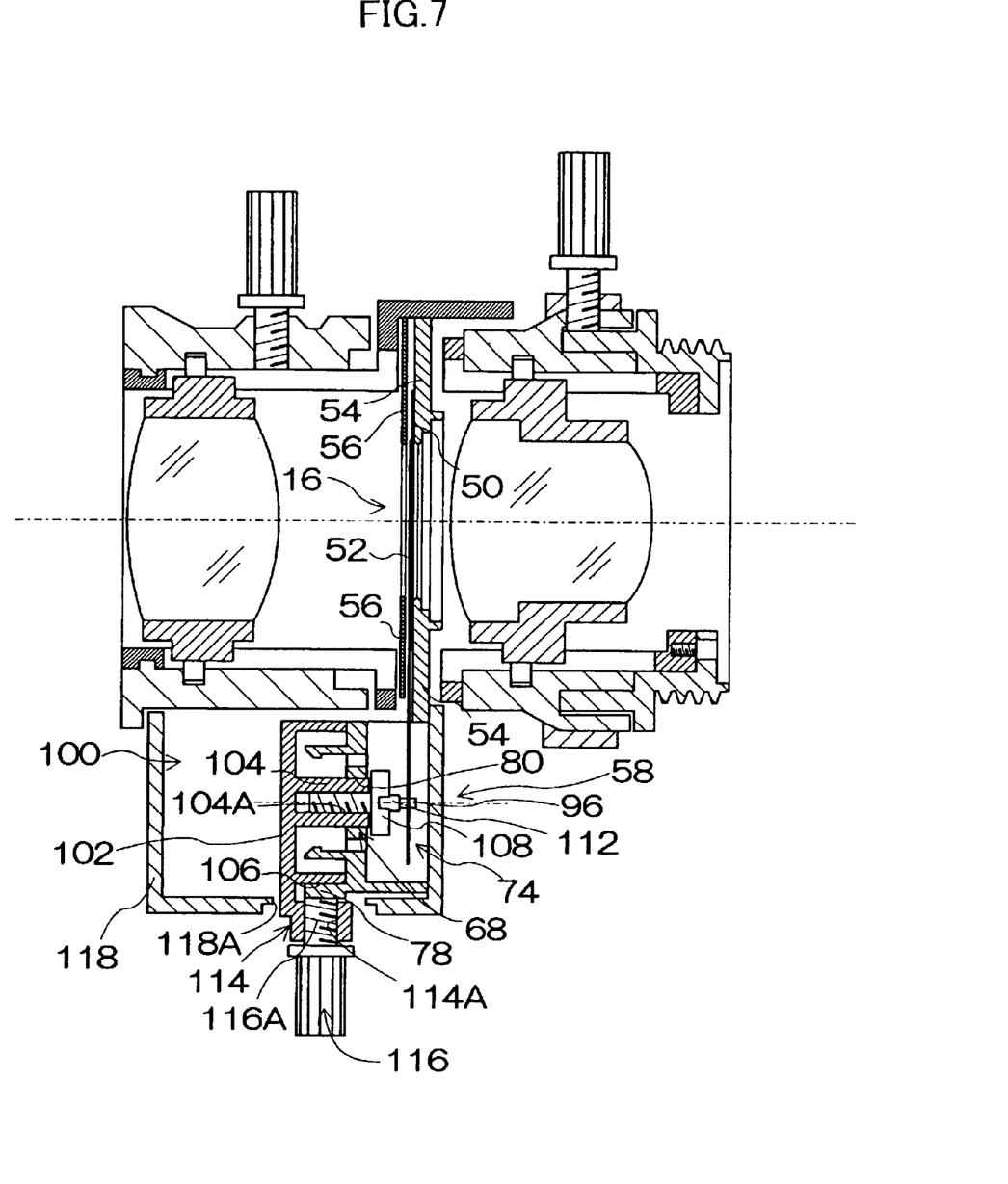
FIG. 7 shows a lateral sectional view of the aperture mechanism when a manual drive mechanism is fitted to the holding portion (holding frame) of the aperture, the aperture mechanism being fitted to the lens barrel.
Figure 8A:
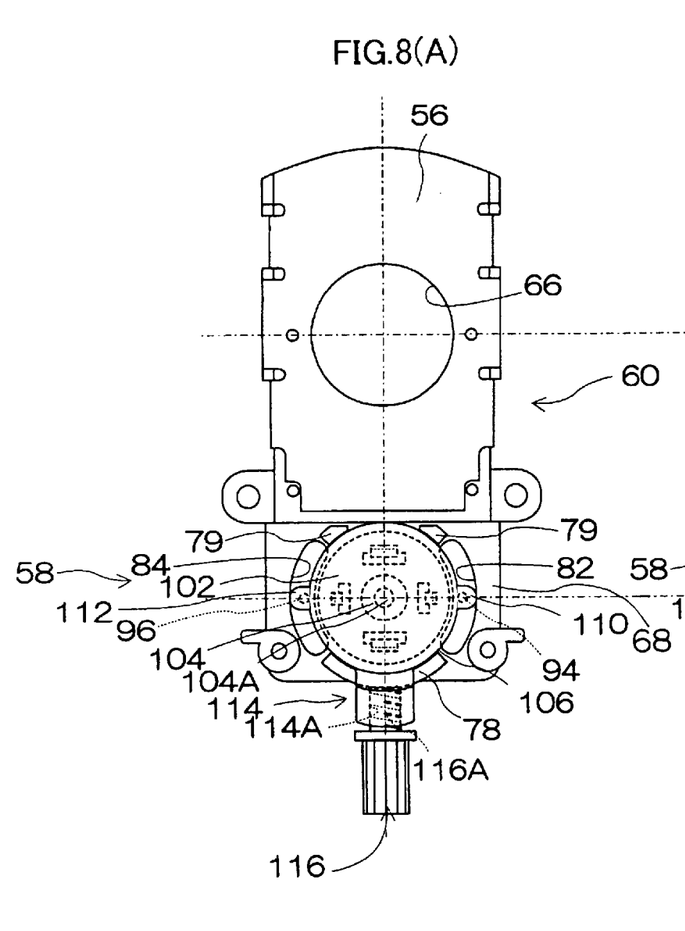
FIGS. 8(A) and 8(B) show a front view and a rear view, respectively, of only the aperture mechanism in FIG. 7.
Figure 8B:
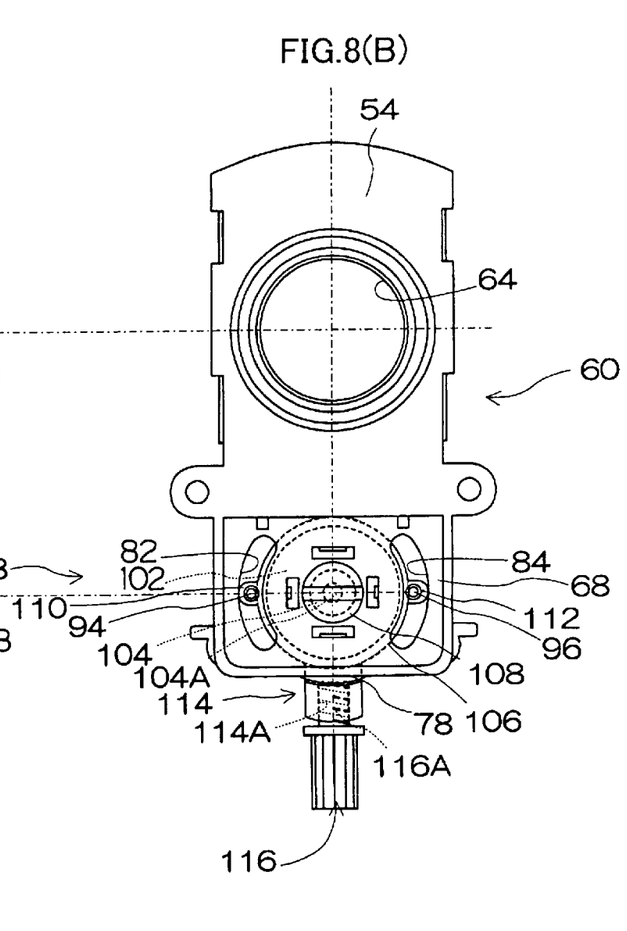

Next will be shown the configuration of the aperture mechanism when a drive mechanism is fitted to the holding frame 54 (the holding portion 58) of the aperture 16. First will be described the configuration in which a manual drive mechanism for manually driving the aperture blades 50 and 52 is fitted to the holding frame 54 of the aperture 16. FIG. 7 shows a lateral sectional view of the aperture mechanism when a manual drive mechanism is fitted to the holding frame 54, the aperture mechanism being fitted to the lens barrel 10. FIGS. 8(A) and 8(B) show a front view and a rear view, respectively, of only the aperture mechanism in FIG. 7. Incidentally, illustration of the aperture blades 50 and 52 is dispensed with in FIGS. 8(A) and 8(B). As shown in these drawings, in a manual drive mechanism 100 is arranged a substantially cylindrical iris ring 102 whose front side is closed and the rear side is open. Inside the iris ring 102 at the center is arranged protrusively a rotation shaft 104, and this rotation shaft 104 is snapped into the hole 80 bored at the center of the holding plate 68. The outer circumferential face 106 of the iris ring 102 engages with the inner circumferential faces of the projections 78, 79 and 79 arranged protrusively on the holding plate 68. This causes the iris ring 102 to be rotatably held by the holding plate 68. Further in the rotation shaft 104 is bored a tapped hole 104A, and by screwing a bolt 108 into that tapped hole 104A from behind the holding plate 68, the iris ring 102 is prevented from coming off the holding plate 68.

On the outer circumferential face 106 of the iris ring 102, two drive pin fitting portions 110 and 112 are arranged symmetrically with respect to the rotation shaft 104, and these drive pin fitting portions 110 and 112 are pressed through the long holes 82 and 84 of the holding plate 68 and extended to the rear side of the holding plate 68 (within the space 74). At the tips of those drive pin fitting portions 110 and 112 are fitted the drive pins 94 and 96 which respectively engage with the long grooves 50C and 52C of the aperture blades 50 and 52 as described above (see FIGS. 6(A) to 6(C)). Therefore, when the iris ring 102 is rotated, the drive pins 94 and 96 rotate pivoting on the rotation shaft 104, and the aperture blades 50 and 52 are opened and closed as shown in FIGS. 6(A) to 6(C).

Further, a knob fitting portion 114 is formed on the iris ring 102, and this knob fitting portion 114 is so arranged as to protrude farther outwards than the outer circumferential face of the projection 78 of the holding plate 68. In the knob fitting portion 114 is formed a tapped hole 114A penetrating to the outer circumferential face of the projection 78, and a knob 116 is fitted to the knob fitting portion 114 by screwing the threaded portion 116A of the knob 116 into this tapped hole 114A.

The knob 116 is exposed farther outwards than the opening 118A of a cover 118 enclosing the whole holding portion 58 exposed out of the lens barrel 10, and the operator can rotate the iris ring 102 by using this knob 116. Further, by screwing the knob 116 in and pressing the tip of the threaded portion 116A against the outer circumferential face of the projection 78, the iris ring 102 can be fixed in a desired position of iris adjustment. When the iris ring 102 is to be rotated, the knob 116 should be loosened.

Figure 9:
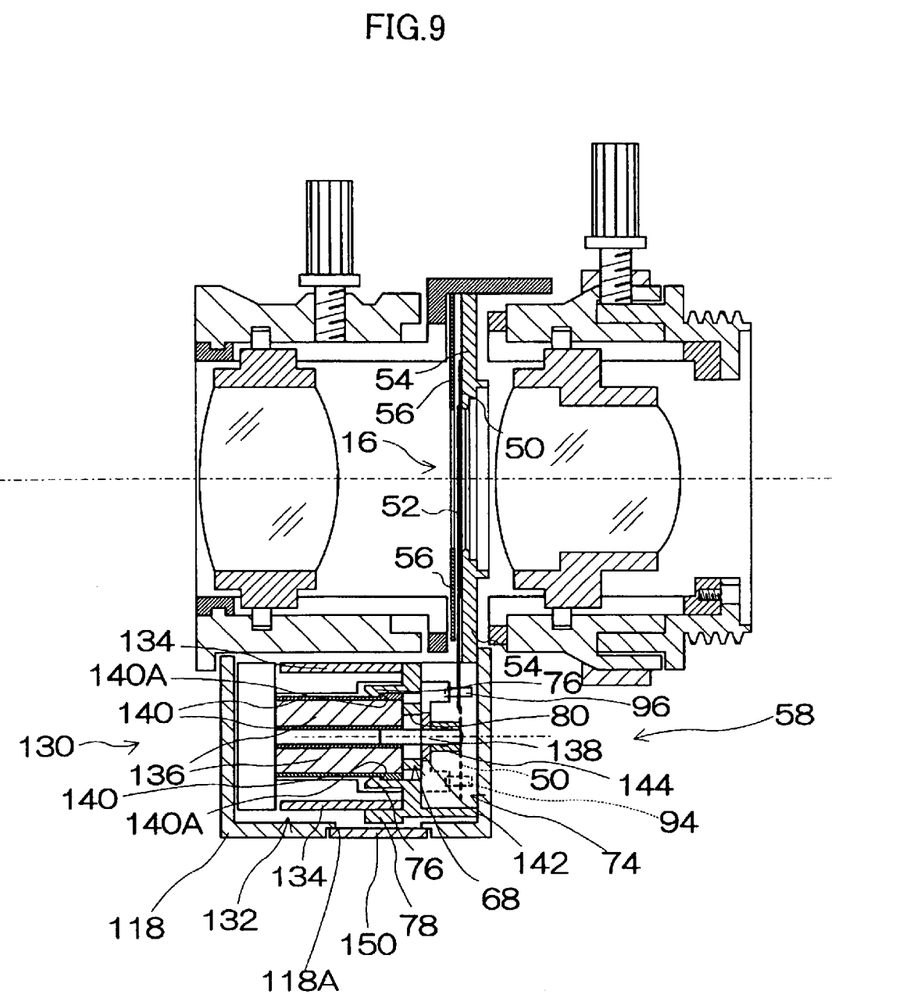
FIG. 9 shows a lateral sectional view of the aperture mechanism when an electrical drive mechanism is fitted to the holding portion (holding frame) of the aperture, the aperture mechanism being fitted to the lens barrel.
Figure 10A:
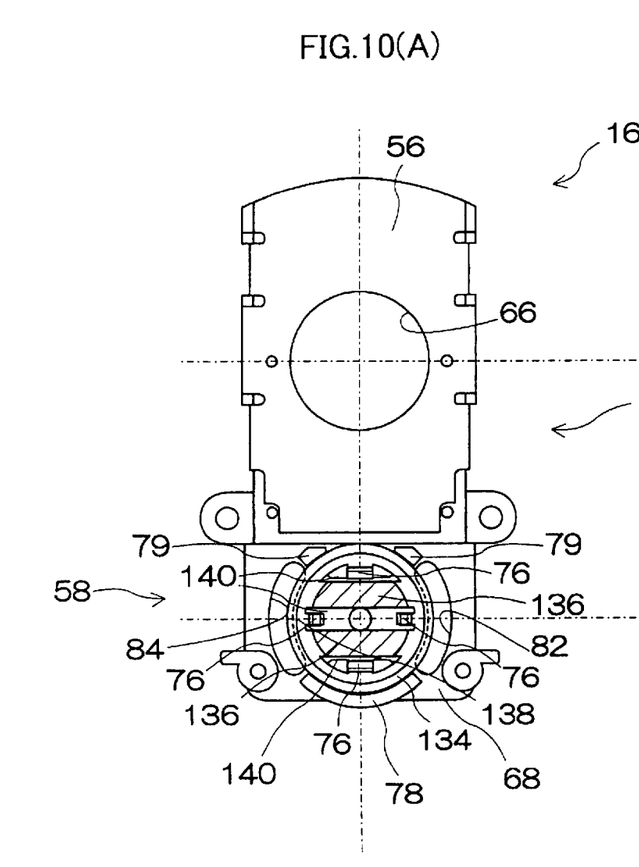
FIGS. 10(A) and 10(B) show a front view and a rear view, respectively, of only the aperture mechanism in FIG. 9.
Figure 10B:
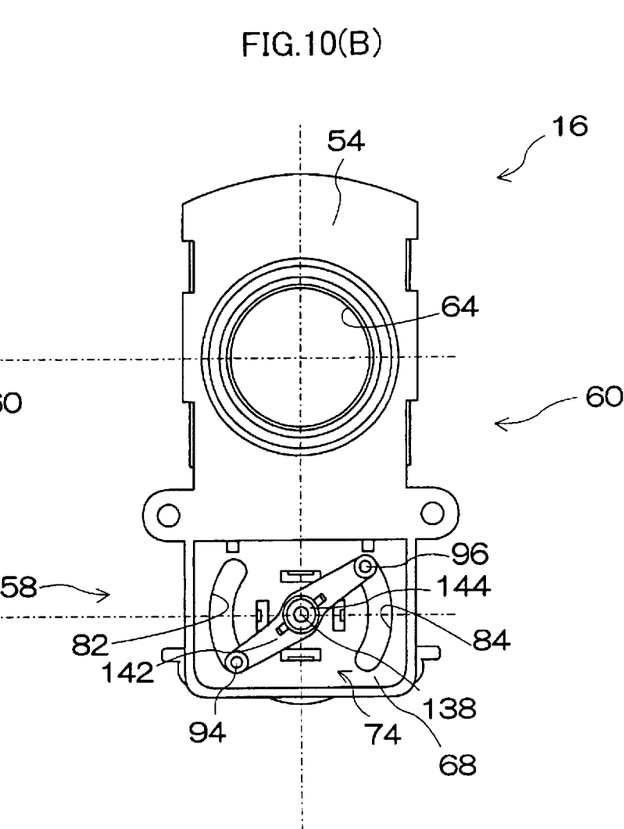

Next will be described the configuration in which the electrical drive mechanism for electrically (automatically) driving the aperture blades 50 and 52 is fitted to the holding frame 54 of the aperture 16 (the holding portion 58). FIG. 9 shows a lateral sectional view of the aperture mechanism wherein the electrical drive mechanism is fitted to the holding frame 54 of the aperture 16, the aperture mechanism being fitted to the lens barrel 10; and FIGS. 10(A) and 10(B) show a front view and a rear view, respectively, of only the aperture mechanism in FIG. 9. Incidentally, illustration of the aperture blades 50 and 52 is dispensed with in FIGS. 10(A) and 10(B). As shown in these drawings, in an electrical drive mechanism 130 is arranged an iris meter 132. Although details of its configuration will not be described herein, the iris meter 132 is configured of a mainly iron-built cylindrical frame 134 and a coil arranging portion 136 disposed in that cylindrical frame 134. In the coil arranging portion 136 are arranged a drive coil for turning a rotation shaft (drive shaft) 138 in the central part and other elements, and the engagement of a step 140A provided on each of frame segments 140 formed in that coil arranging portion 136 with one or another of the pawls 76 arranged protrusively on the holding plate 68 causes the coil arranging portion 136 to be fitted to the holding plate 68. Further, by engaging with the projections 78, 79 and 79 arranged protrusively on the holding plate 68, the cylindrical frame 134 is held by the holding plate 68.

The rotation shaft 138 is pressed through the hole 80 of the holding plate 68 to protrude to the rear side of the holding plate 68 (the space 74), and in the space 74 a lever 142 is fixed to the rotation shaft 138 with a fixing member 144. At the tips of the two arms of the lever 142 are fitted, as described above, the drive pins 94 and 96 to engage with the long grooves 50C and 52C of the aperture blades 50 and 52.

In this arrangement, when the rotation shaft 138 is rotated with the iris meter 132 placed under electrical control, the lever 142 turns and, as shown in FIGS. 6(A) to 6(C), the drive pins 94 and 96 rock pivoting on the rotation shaft 138, to open and close the aperture blades 50 and 52 as described above.

To add, similarly to the case in which the aperture 16 to whose holding frame 54 is fitted with a manual drive mechanism is fitted to the lens barrel 10 as shown in FIG. 7, in the case in which an electrical drive mechanism is fitted to the holding frame 54, too, the cover 118 enclosing the whole holding portion 58 is fitted as shown in FIG. 9, and its opening 118A can be shielded by fitting a shielding member 150.

Figure 11:
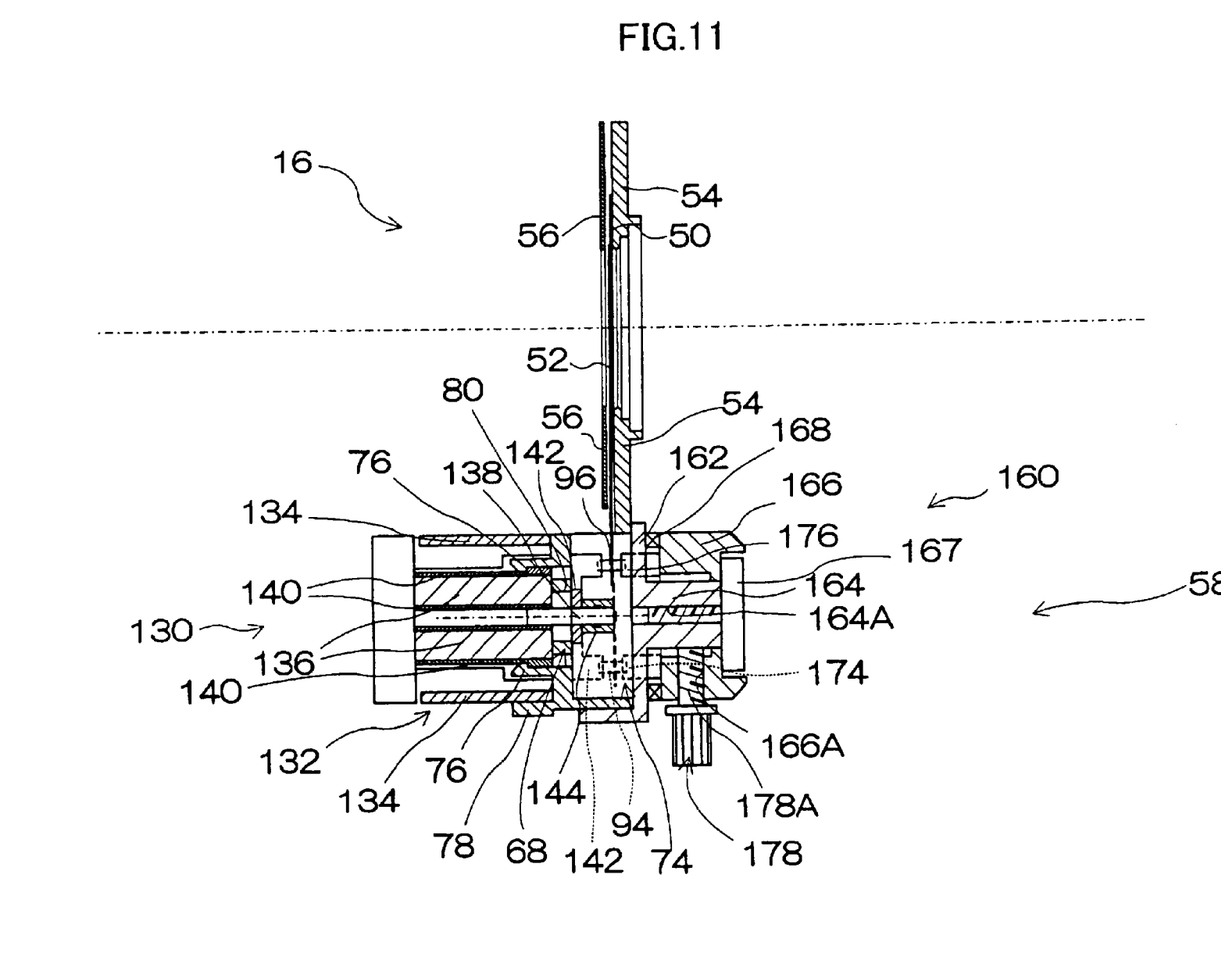
FIG. 11 shows a lateral sectional view of the configuration of the aperture mechanism when both the manual drive mechanism and the electrical drive mechanism are made fittable to the holding frame of the aperture at the same time.

Although the above-described embodiment of the invention permits fitting to the aperture 16 either a manual drive mechanism or an electrical drive mechanism, the possible configuration is not limited to this, but both a manual drive mechanism and an electrical drive mechanism can be fitted to the aperture 16 at the same time so that the iris aperture can be adjusted with a desired one of the two mechanisms. FIG. 11 shows a lateral sectional view of the configuration of the aperture mechanism in this case, wherein the configurations and actions of the aperture 16 and the electrical drive mechanism 130 are the same as their respective counterparts in FIG. 9, and therefore their description is dispensed with. A manual drive mechanism 160 can be fitted opposite the electrical drive mechanism 130 with the aperture blades 50 and 52 between them. Where the manual drive mechanism 160 is to be fitted, a holding plate for manual use 162 is arranged in the opening on the rear side in the holding portion 58 of the aperture 16. To add, the holding plate for manual use 162 can be fixed to the side plate 70 of the holding portion 58 with bolts or the like. In the central part of the holding plate for manual use 162 is formed a shaft portion 164 protruding on the rear side, and an iris ring 166 is rotatably supported by this shaft portion 164. The iris ring 166 is prevented from coming off the shaft portion 164 by a set screw 167 fitted into a tapped hole 164A of the shaft portion 164. To add, a corrugated leaf spring 168 for providing a torque to the iris ring 166 is fitted between the iris ring 166 and the holding plate for manual use 162.

Figure 12:
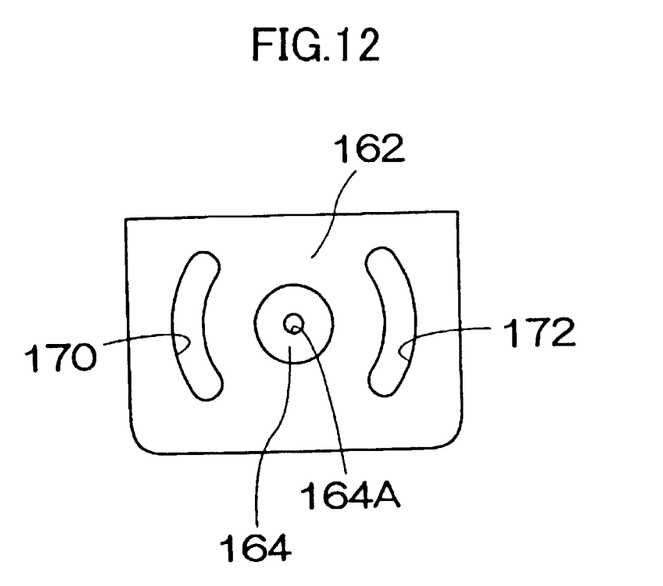
FIG. 12 shows a rear view of the holding plate for manual use in FIG. 11.

To show the holding plate for manual use 162 from the rear side as in FIG. 12, long holes 170 and 172 similarly to their counterparts in the holding plate 68 in positions opposite the holding plate 68. On the other hand, to show the iris ring 166 from the front side as in FIG. 13, at the front end of the iris ring 166 are protrusively arranged drive pin fitting portions 174 and 176 symmetrically with respect to the rotation axis. The drive pin fitting portions 174 and 176 are pressed through the long holes 170 and 172 of the holding plate for manual use 162, to whose tip is fitted one end of each of the drive pins 94 and 96.

Figure 13:
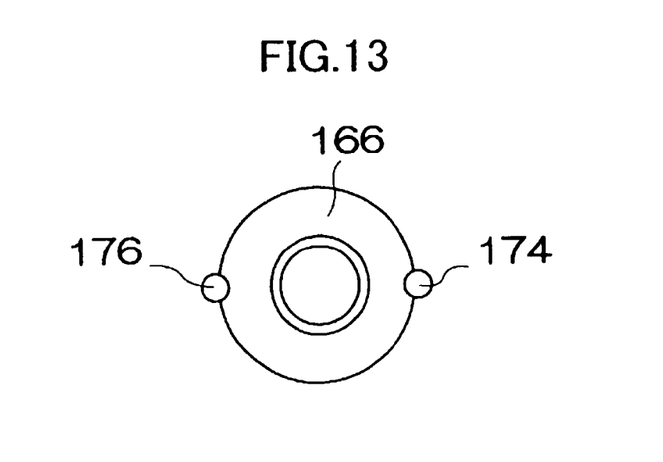
FIG. 13 shows a front view of the configuration of an iris ring in FIG. 11.

In this arrangement, when the iris ring 166 is rotated, and the drive pins 94 and 96 rock to open and close the aperture blades 50 and 52.

In the iris ring 166 is bored a tapped hole 166A penetrating to the shaft portion 164, and a knob 178 can be fitted to the iris ring 166 by screwing the threaded portion 178A of the knob 178 into this tapped hole 166A. The iris ring 166 can be rotated and, by screwing the knob 178 in and pressing the tip of the threaded portion 178A against the shaft portion 164, the iris ring 166 can be fixed in a desired position of iris adjustment.

By fitting an electrical drive mechanism and a manual drive mechanism to the aperture 16 at the same time as described above, iris adjustment can be accomplished either electrically (automatically) or manually without having to replace the drive mechanism to be worked. To add, in the configuration illustrated in FIG. 11, it is also conceivable to fit only one or the other of the electrical drive mechanism and the manual drive mechanism to the holding frame 54 of the aperture 16.

In the configuration of the aperture mechanism in the mode of implementing the invention as described above, as an electrical drive mechanism or a manual drive mechanism is fitted to the holding frame 54 of the aperture 16 (the holding portion 58) without using an adhesive or the like, the fitted drive mechanism can be removed from the holding frame 54, but it is also conceivable to fit the drive mechanism to the holding frame 54 by some irremovable means.

Although the iris aperture of the aperture mechanism described above is to be adjusted with the two aperture blades 50 and 52, a configuration similar to that of the holding portion 58 in the above-described embodiment can be provided for any aperture mechanism whose iris aperture is to be adjusted in some other manner, and the invention can be thereby applied as well.

As hitherto described, since the aperture mechanism according to the invention permits an electrical drive mechanism and a manual drive mechanism to be fitted to a common holding frame, there is no need to alter the configuration of other constituent members than the drive mechanism, such as the shapes of the aperture blades and the holding frame or the holding form of the lens barrel according to whether the electrical drive mechanism or the manual drive mechanism is used, and therefore the manufacturing cost can be substantially reduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An aperture mechanism comprising:

aperture blades;

a holding frame which holds the aperture blades; and a drive mechanism which opens and closes the aperture blades, the drive mechanism being fitted to the holding frame, wherein the holding frame is adapted to receive a desired one of an electrical drive mechanism which opens and closes the aperture blades electrically and a manual drive mechanism which opens and closes the aperture blades manually as the drive mechanism;

wherein:

a holding portion which holds the drive mechanism is formed on the holding frame;

pin engaging portions which engage with drive pins of the drive mechanism and open and close the aperture blades by shifting of the drive pins are arranged on a face other than a holding face of the holding portion where the drive mechanism is held;

a first hole through which a drive shaft of an iris meter for driving the drive pins in the electrical drive mechanism are inserted are provided in the holding face; and a second hole through which the drive pins in the manual drive mechanism are inserted are provided in the holding face.

2. An aperture mechanism comprising:

aperture blades;

a holding frame which holds the aperture blades; and a drive mechanism which opens and closes the aperture blades, the drive mechanism being fitted to the holding frame, wherein the holding frame is adapted to receive a desired one of an electrical drive mechanism which opens and closes the aperture blades electrically and a manual drive mechanism which opens and closes the aperture blades manually as the drive mechanism;

wherein the holding frame is capable of simultaneously receiving both the electrical drive mechanism and the manual drive mechanism, and the aperture blades are opened and closed with a desired one of the electrical drive mechanism and the manual drive mechanism.

3. An aperture mechanism comprising:

aperture blades;

a holding frame which holds the aperture blades; and a drive mechanism which opens and closes the aperture blades, the drive mechanism being fitted to the holding frame, wherein the holding frame is adapted to receive a desired one of an electrical drive mechanism which opens and closes the aperture blades electrically and a manual drive mechanism which opens and closes the aperture blades manually as the drive mechanism;

wherein the one of the electrical drive mechanism and the manual drive mechanism are capable of being attached to and detached from the holding frame as desired; and wherein:

a holding portion which holds the drive mechanism is formed on the holding frame;

pin engaging portions which engage with drive pins of the drive mechanism and open and close the aperture blades by shifting of the drive pins are arranged on a face other than a holding face of the holding portion where the drive mechanism is held;

a first hole through which a drive shaft of an iris meter for driving the drive pins in the electrical drive mechanism are inserted are provided in the holding face; and a second hole through which the drive pins in the manual drive mechanism are inserted are provided in the holding face.

4. An aperture mechanism comprising:

aperture blades;

a holding frame which holds the aperture blades; and a drive mechanism which opens and closes the aperture blades, the drive mechanism being fitted to the holding frame, wherein the holding frame is adapted to receive a desired one of an electrical drive mechanism which opens and closes the aperture blades electrically and a manual drive mechanism which opens and closes the aperture blades manually as the drive mechanism;

wherein the one of the electrical drive mechanism and the manual drive mechanism are capable of being attached to and detached from the holding frame as desired; and wherein the holding frame is capable of simultaneously receiving both the electrical drive mechanism and the manual drive mechanism, and the aperture blades are opened and closed with a desired one of the electrical drive mechanism and the manual drive mechanism.

5. An aperture mechanism system, comprising:

aperture blades;

a holding frame which holds the aperture blades;

a holding portion structured and arranged to fit and hold a drive mechanism to open and close the aperture blades;

an electrical drive mechanism that can be installed as the drive mechanism held by the holding portion; and a manual drive mechanism that can be installed as the drive mechanism held by the holding portion;

wherein only one of the electrical drive mechanism and the manual drive mechanism can be installed in the holding portion at a time.

6. The aperture mechanism system of claim 5, wherein the holding portion includes a holding plate, to which either of the electrical drive mechanism and the manual drive mechanism can be secured.

* * * * *